US012129188B2

(12) United States Patent
Garrison

(10) Patent No.: US 12,129,188 B2
(45) Date of Patent: Oct. 29, 2024

(54) SYSTEM AND METHOD FOR FLUID DISTILLATION

(71) Applicant: Russell J. Garrison, Duncan, OK (US)

(72) Inventor: Russell J. Garrison, Duncan, OK (US)

( * ) Notice: Subject to any disclaimer, the term of this patent is extended or adjusted under 35 U.S.C. 154(b) by 310 days.

(21) Appl. No.: 17/412,706

(22) Filed: Aug. 26, 2021

(65) Prior Publication Data

US 2022/0062784 A1 Mar. 3, 2022

Related U.S. Application Data

(60) Provisional application No. 63/072,867, filed on Aug. 31, 2020.

(51) Int. Cl.
| | |
|---|---|
| *C02F 1/04* | (2023.01) |
| *B01D 3/14* | (2006.01) |
| *B01D 5/00* | (2006.01) |
| *E21B 43/26* | (2006.01) |
| *E21B 43/34* | (2006.01) |
| *C02F 103/10* | (2006.01) |

(52) U.S. Cl.
CPC .............. *C02F 1/048* (2013.01); *B01D 3/141* (2013.01); *B01D 5/006* (2013.01); *C02F 1/043* (2013.01); *E21B 43/2607* (2020.05); *E21B 43/34* (2013.01); *C02F 2103/10* (2013.01)

(58) Field of Classification Search
CPC .. C02F 1/04; C02F 1/043; C02F 1/048; C02F 1/16; C02F 2103/10; B01D 1/0011; B01D 1/0058; B01D 3/343; B01D 5/006; E21B 43/2607; E21B 43/34; E21B 43/35
See application file for complete search history.

(56) References Cited

U.S. PATENT DOCUMENTS

| | | | |
|---|---|---|---|
| 206,075 A | 7/1878 | Bigalow | |
| 394,689 A | 12/1888 | Hadley | |
| 1,946,229 A | 2/1934 | McMurray | |
| 2,495,673 A | 1/1950 | Erwin et al. | |
| 9,920,605 B2 | 3/2018 | Hoffman | |
| 2015/0336024 A1* | 11/2015 | Zebuhr | B01D 1/225 202/175 |
| 2018/0079662 A1* | 3/2018 | Bower | B01D 61/364 |

* cited by examiner

*Primary Examiner* — Renee Robinson
(74) *Attorney, Agent, or Firm* — Dunlap Codding, P.C.

(57) ABSTRACT

Systems and methods of onsite distillation of contaminated fluid are disclosed, including a fluid distillation system comprising a tank having one or more exhaust outlet in one or more sidewall; a mid-floor plate within the tank dividing the tank into an upper chamber and a lower chamber; the exhaust outlet positioned in the lower chamber; one or more divider wall positioned in the lower chamber of the tank thereby dividing the lower chamber into two or more sections; one or more heating tube assembly, positioned between the bottom of the tank and the exhaust outlet, comprising: an outer burn chamber positioned outside the tank and having an inlet and a connecting tube; and an internal burn chamber extending from the connecting tube of the outer burn chamber through the one or more side wall of the tank.

9 Claims, 7 Drawing Sheets

SYSTEM AND METHOD FOR FLUID DISTILLATION

CROSS-REFERENCE TO RELATED APPLICATIONS

This application claims priority to U.S. Provisional Application Ser. No. 63/072,867, filed Aug. 31, 2020, the entire contents of which being hereby expressly incorporated herein by reference.

FIELD OF THE DISCLOSURE

The present invention relates generally to systems and processes for fluid distillation, and more particularly, and without limitation, to systems and processes for fluid distillation of the contaminated fluid byproduct of hydraulically fractured wells, the fluid byproduct known as hydraulic fracturing flowback.

BACKGROUND

Hydraulic fracturing is a well-stimulation technique in which a hydrocarbon-bearing subterranean formation is fractured by a pressurized liquid. The process involves the high-pressure injection of a fracturing fluid into a borehole to create fractures in the deep hydrocarbon-bearing subterranean formations through which hydrocarbons (oil, natural gas, etc.) will flow.

The majority of the fracturing fluid typically comprises water and proppant (such as sand, treated sand, and/or man-made ceramic materials). However, the fracturing fluid typically also includes additives which may be harmful to the environment, such as polymers, surfactants, hydrochloric acid, friction reducers, guar gum, biocides, emulsion breakers, emulsifiers, glycols, diesel fuels, 2-butoxyethanol, radioactive tracer isotopes, and/or other additives. Some additives are gelling agents which viscosify fracturing fluids. The addition of glycols, such as ethylene glycol (EG), to fluids gelled with a guar gum compound can increase the viscosity of the fluid and stabilize the fluid brines. Additionally, proppant-retention agents are commonly used during the latter stages of the hydraulic fracturing treatment to limit the flowback of a proppant placed into the formation. These propping agents may also contain harmful additives. The EPA has authority to regulate hydraulic fracturing, when diesel fuels are used in fracturing fluids or propping agents.

When the pressure from the fracking is released, a portion of the used fracturing fluid, including the harmful additives, returns to the surface as "fracking fluid flowback" (referred to herein as "hydraulic fracturing flowback"). Hydraulic fracturing flowback may contaminate the environment and/or pose harm to humans if not disposed of appropriately.

As the number of hydraulic-fractured wells increases, the volume of hydraulic fracturing flowback which requires treatment and/or disposal increases. Hydraulic fracturing flowback typically contains high levels of contaminants, including salts, organic/inorganic chemicals, metals, radioactive materials, etc. These chemical additives and the vast quantities of water used for fracking have raised environmental concerns, including a toxic risk to aquatic organisms. Therefore, the hydraulic fracturing flowback cannot be released where it may enter into rivers or groundwater and cannot be easily disposed. Currently, hydraulic fracturing flowback may be treated through electrocoagulation and/or may be disposed of via underground injection, wastewater treatment facilities, surface impoundments, or recycling.

According to the EPA, underground injection through "injection wells" is the most common method of managing hydraulic fracturing flowback. Over two billion gallons of hydraulic fracturing flowback are injected in the United States every day, and approximately 180,000 injection wells are in operation in the United States. However, injection wells have become more strictly regulated as they have been linked to triggering earthquakes and possible water table contamination. Further, transporting the hydraulic fracturing flowback to the injection wells carries the risk of spills causing environmental and safety impacts.

Additionally, hydraulic fracturing flowback discharged to treatment facilities requires transportation to treatment plants, which may be cost ineffective and carry the risk of spills causing environmental and safety impacts. Surface impoundments, such as pits, ponds, or surface storage tanks, are also used for the management of hydraulic fracturing flowback. However, surface impoundments carry the risk of breach, such as through flooding of pits and ponds, or through structural failure, which may release the hydraulic fracturing flowback into the environment.

Contaminated fluid, such as hydraulic fracturing flowback, may be collected, stored, processed to remove contaminants, and then disposed of as non-hazardous wastewater. Fluid storage tanks, such as trailer tanks or "frac" tanks, may be used to provide storage for hydraulic fracturing flowback at various locations, such as at drilling sites for oil and gas wells, manufacturing facilities, warehouses, user facilities (e.g., biodiesel storage for farms), trans loading facilities, municipal and public works locations, etc.

What is needed to solve the problems in transporting, storing, treating, and disposing, large quantities of hydraulic fracturing flowback, is onsite, and/or near-site, distillation of fluid in the hydraulic fracturing flowback to reduce the volume of contaminated material for transport, storage, treatment, and disposal. Removing the water from hydraulic fracturing flowback may reduce the volume of the hydraulic fracturing flowback by approximately 92-95%. Such a reduction in quantity of contaminated material reduce the costs for storing, handling, and transporting the material, as well as the associated risk to the environment and human health.

BRIEF DESCRIPTION OF THE DRAWINGS

The accompanying drawings, which are incorporated in and constitute a part of this specification, illustrate one or more embodiments described herein and, together with the description, explain these embodiments. The drawings are not intended to be drawn to scale, and certain features and certain views of the figures may be shown exaggerated, to scale, or schematically in the interest of clarity and conciseness. Not every component may be labeled in every drawing. Like reference numerals in the figures may represent and refer to the same or similar element or function. In the drawings.

DETAILED DESCRIPTION

Figure 1:
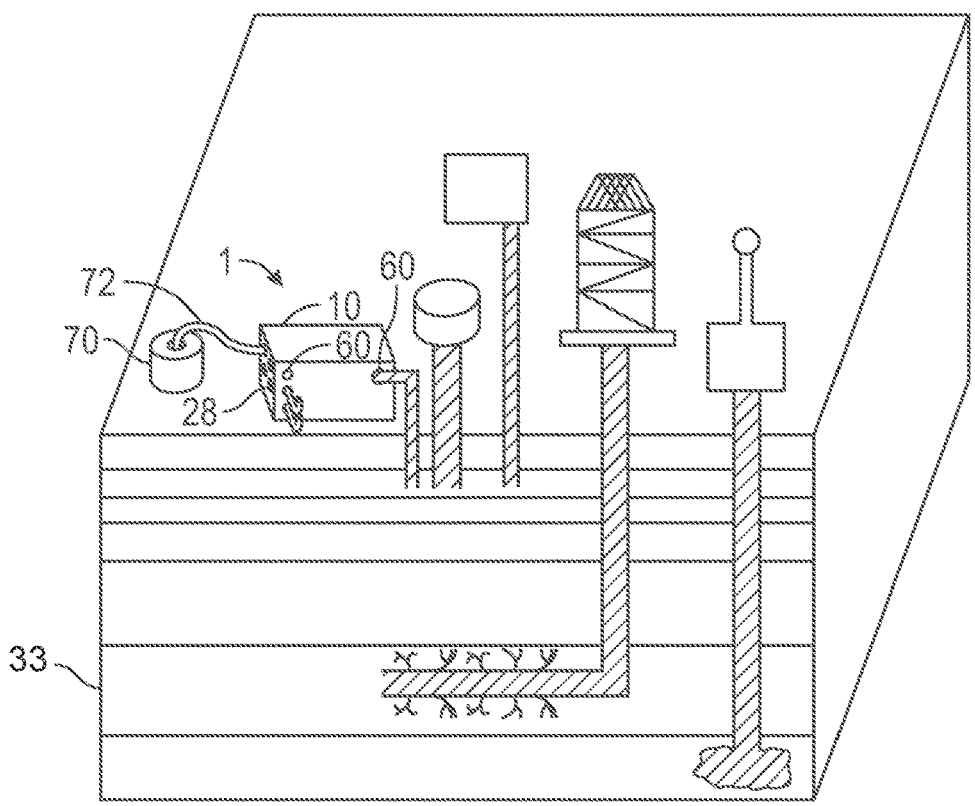
FIG. 1 is a general representation of an exemplary fluid distillation system in use within a hydrocarbon extraction industry environment in accordance with one aspect of the present disclosure.

The following detailed description refers to the accompanying drawings. The same reference numbers in different drawings may identify the same or similar elements.

The mechanisms proposed in this disclosure circumvent the problems described above. The present disclosure describes a system configured to reduce the quantity of contaminated material to be stored, shipped, or treated, thereby reducing cost and risk to the environment and human health involved in handling and/or transport.

In one embodiment, a fluid distillation system, such as a hydraulic fracturing flowback fluid distillation system, may comprise a compartmentalized tank and a plurality of heating tube assemblies to distill water from hydraulic fracturing flowback. In one embodiment, the compartmentalized tank may have sections, and the system may comprise one heating tube assembly per section. In one embodiment, openings proximate to the bottom of the tank are insertion points for the heating tube assemblies. In one embodiment, the heating tube assemblies may comprise one or more internal burn chamber. In one embodiment, the heating tube assemblies may be attached, such as welded, to the bottom of the tank. In one embodiment the system may comprise one or more exhaust outlet and or one or more exhaust pipe, which may be attached, such as welded, to the outside edge of the tank, such as connected through a structure outlet. The length of the heating tube assembly may be based on efficient gasification. The system may further comprise one or more outlet, to facilitate venting of water vapor. The system may further comprise one or more temperature resistant discharge hose for condensation of the vapor downstream of the process.

In one implementation, a fluid distillation system may comprise a tank having a bottom and one or more sidewalls connected to the bottom, the one or more sidewalls having one or more exhaust outlets through the one or more sidewalls; a mid-floor plate within the tank having a top side and a bottom side, the mid-floor plate connected to the one or more sidewalls such that the mid-floor plate divides the tank into an upper chamber above the top side of the mid-floor plate and a lower chamber between the bottom of the tank and the bottom side of the mid-floor plate, wherein the one or more exhaust outlets of the one or more sidewalls are positioned between the bottom of the tank and the bottom side of the mid-floor plate; one or more divider wall positioned in the lower chamber of the tank and extending between the bottom of the tank and the bottom side of the mid-floor plate, such that the lower chamber is divided into two or more sections; and one or more heating tube assemblies positioned in the lower chamber between the bottom of the tank and bottom side of the mid-floor plate, the one or more heating tube assemblies each comprising: an outer burn chamber positioned outside the tank and having an inlet and a connecting tube; and an internal burn chamber extending from the connecting tube of the outer burn chamber through the one or more sidewall of the tank into a corresponding one of the two or more sections of the lower chamber of the tank toward the mid-floor plate.

In one implementation, a fluid distillation method may comprise: importing a contaminated fluid into an upper chamber of a tank through one or more flowback ports positioned in one or more sidewalls of the tank; heating the contaminated fluid to a boiling point such that water in the contaminated fluid is vaporized and separated from the contaminated fluid by: inserting fuel into an outer burn chamber of a heating tube of the tank, the outer burn chamber positioned externally to the tank and fluidly connected, via a connecting tube extending through the one or more sidewalls of the tank, to an internal burn chamber positioned in a lower chamber of the tank, the lower chamber of the tank separated from the upper chamber of the tank by a mid-floor plate; igniting the fuel in the one or more outer burn chamber such that combustion gases are created in the outer burn chamber; and circulating the combustion gases through the connecting tube into the one or more internal burn chamber and releasing the combustion gases through a top end of the one or more internal burn chamber, thereby heating the mid-floor plate; and releasing the combustion gases out of the tank through one or more exhaust outlets, such as outlets extending through the one or more sidewalls of the tank.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, FIG. 1 illustrates an exemplary fluid distillation system 1 in a hydrocarbon recovery environment. The fluid distillation system 1 is adapted to distill water from hydraulic fracture flowback; thereby reducing the volume of hydraulic fracture flowback to be stored, treated, and/or transported.

As illustrated in FIGS. 1-6, the fluid distillation system 1 may comprise a tank 10, a mid-floor plate 3 within the interior of the tank 10 which divides the tank 10 into an upper chamber 18 and a lower chamber 19, one or more divider wall 32 (which may be referred to in the singular as divider wall 32, or in the plural as divider walls 32a-32n) within the lower chamber 19 dividing the lower chamber 19 into two or more sections 11, and one or more heating tube assembly 40 extending into each of the two or more sections 11. The fluid distillation system 1 may further comprise one or more exhaust pipe 80 extending from the two or more sections 11.

Figure 2:
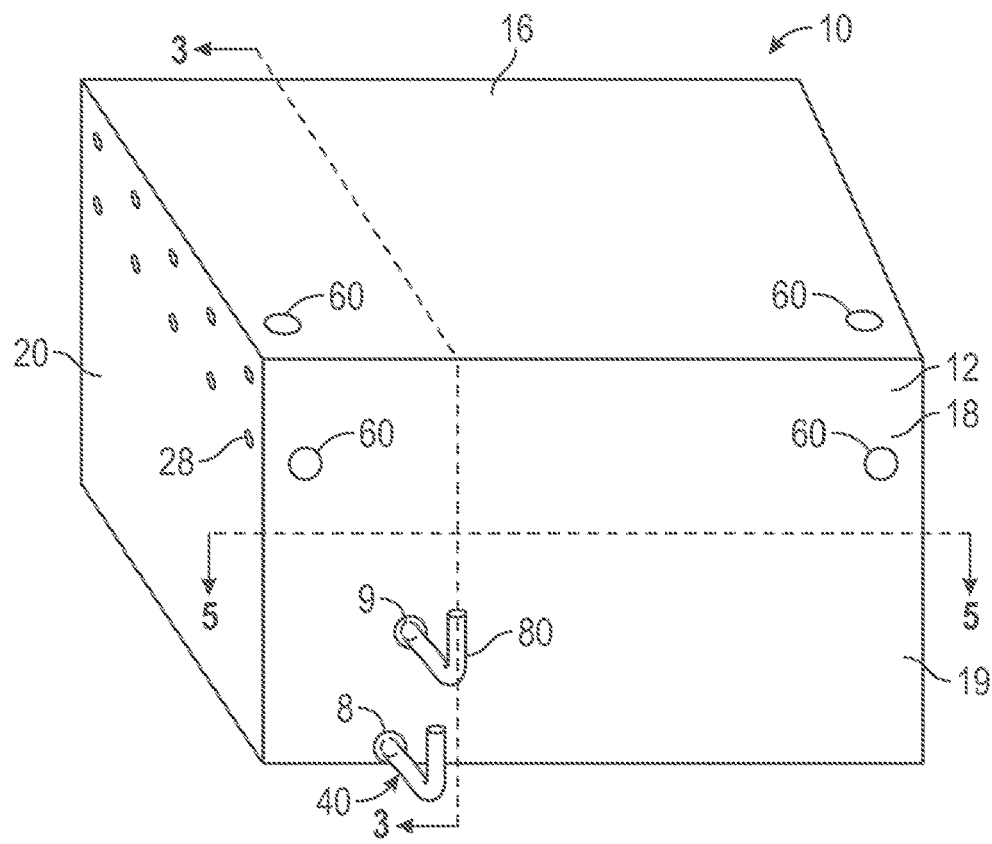
FIG. 2 is a perspective view of the exemplary fluid distillation system of FIG. 1.
Figure 3:
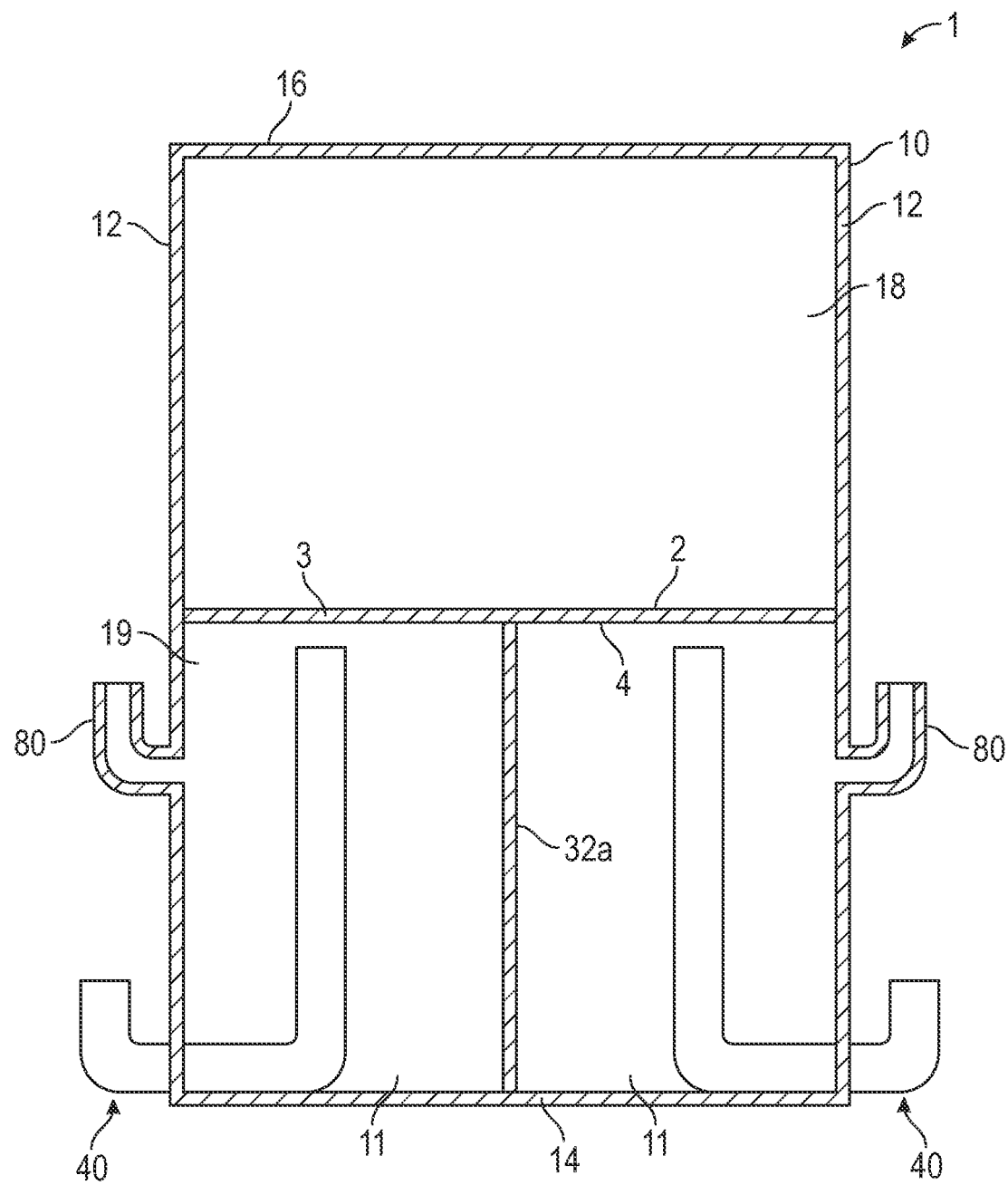
FIG. 3 is a cross-sectional view of the exemplary fluid distillation system of FIG. 2.

As illustrated in FIGS. 2 and 3, the tank 10 may have one or more sidewall 12 and a bottom 14 cooperating to form the interior of the tank 10. In one embodiment, the tank 10 may further have a top 16 cooperating with the one or more sidewall 12 and the bottom 14 to form the interior of the tank 10. In one embodiment, the tank 10 may have one or more end wall 20 cooperating with the one or more sidewall 12, the bottom 14, and/or the top 16 to form the interior of the tank 10. The one or more sidewall 12, the bottom 14, the top 16, and end wall 20 are formed of one or more materials impermeable to fluids and/or gasses, such as steel. The tank 10 may have a longitudinal length and may have a lateral width substantially perpendicular to the longitudinal length. In one embodiment, the tank 10 may be a tank 10 commonly used to transport hydraulic fracturing flowback and/or proppant, for example.

The one or more sidewall 12 may have one or more opening 8 proximate to the bottom 14 of the tank 10, and one or more structure outlet 9 located between the opening 8 and the mid-floor plate 3. In one embodiment, the opening 8 may be square shaped.

Figure 5:
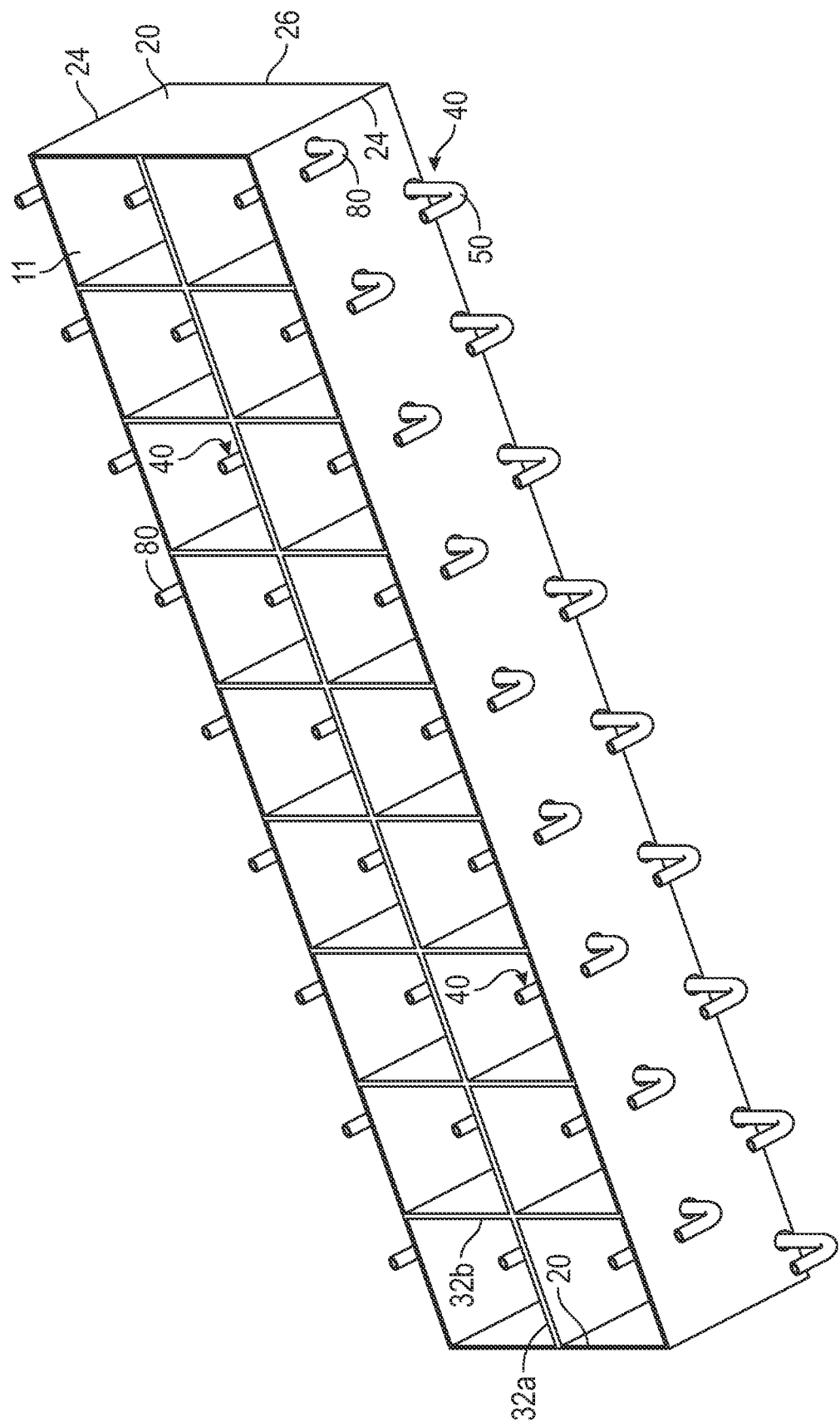
FIG. 5 is a perspective cross-sectional view of the exemplary fluid distillation system of FIG. 2.
Figure 6:
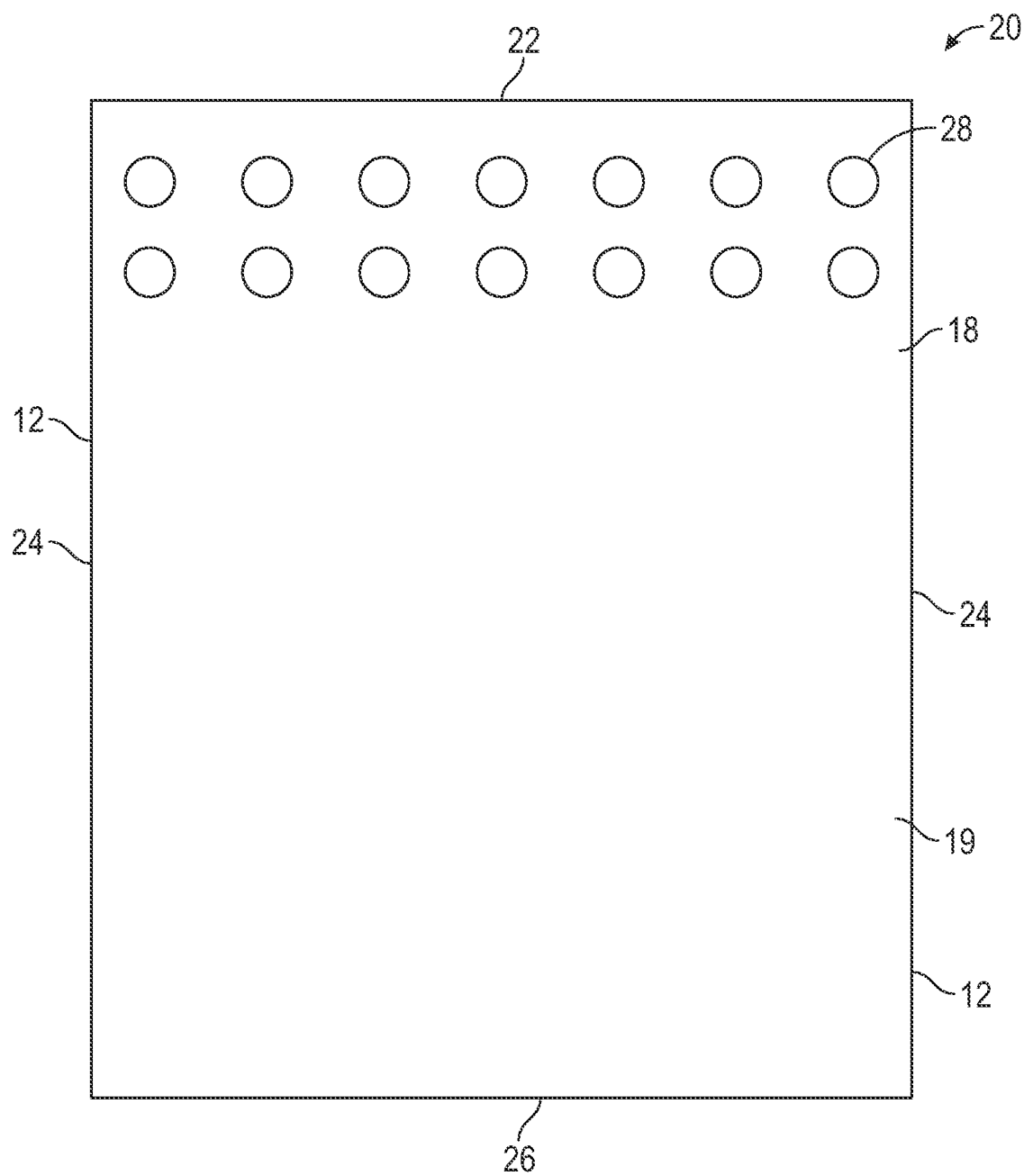
FIG. 6 is a view of an exemplary end wall of the exemplary fluid distillation system of FIG. 1.

As illustrated in FIG. 5 and FIG. 6, the tank 10 may have one or more end wall 20. The end wall 20 has a top 22, a bottom 26, and two sides 24 extending between the top 22 and the bottom 26. The top 22 of the end wall 20 may be secured to the top 16 of the tank 10, the bottom 26 of the end wall 20 may be secured to the bottom 14 of the tank 10, and the two sides 24 of the end wall 20 may be secured to the one or more sidewall 12 of the tank 10. In one embodiment, the one or more end wall 20 may have one or more outlet 28. The one or more outlet 28 may be located proximate to the top 22 of the one or more end wall 20. The outlet 28 may be configured to release vapor from the upper chamber 18. In one embodiment, the outlet 28 may be a vent. In one embodiment, the outlet 28 may be a hammer union valve or the like.

As illustrated in FIG. 3, the mid-floor plate 3 is structured to support, and to transfer heat to a fluid 29, such as hydraulic fracturing flowback 29, in the upper chamber 18 of the tank 10. In one embodiment the fluid 29 may be a contaminated fluid. In one embodiment, the mid-floor plate may bisect the tank 10. The mid-floor plate 3 has a top side 2 and a bottom side 4. The mid-floor plate 3 may be secured to and/or supported by the one or more sidewall 12 of the tank 10 and/or the one or more divider wall 32a-32n. The mid-floor plate 3 may be aligned along a substantially horizontal plane within the tank 10 when the tank 10 is positioned on a substantially horizontal surface. For example, the horizontal plan may be within ten degrees of horizontal and/or within manufacturing tolerances. The mid-floor plate 3 may be comprised of various materials. A person of ordinary skill in the art would understand that the material composition of the mid-floor plate may be chosen to structurally support a predetermined maximum volume of fluid to be supported by the mid-floor plate 3. In one embodiment, the mid-floor plate 3 may be comprised of mild steel. The mid-floor plate 3 may be a single piece extending the longitudinal length and width of the interior of the tank 10, or may be composed of two or more pieces to extend the longitudinal length of the tank 10.

As illustrated in FIGS. 1, 2, 4A, and 4B, the upper chamber 18 may have one or more flowback port 60. The fluid 29 may be imported into the upper chamber 18 through the one or more flowback port 60. In one embodiment, as the hydraulic fracturing flowback is extracted from the subterranean formation 33, as illustrated in FIG. 1, the hydraulic fracturing flowback may be imported into the upper chamber 18 of the fluid distillation system 1 through the flowback port 60. One or more measurement gages and/or sensors of fluid level may be incorporated into the tank 10, such as a sight glass, a mechanical fluid level indicator, and/or a digital sensor.

As seen in FIGS. 3 and 5, the one or more divider wall 32 may be aligned along a substantially vertical plane within the tank 10 when the tank 10 is positioned on a substantially horizontal surface, within manufacturing tolerances for derivation from the vertical plane.

The one or more divider wall 32 may comprise one or more first divider wall 32a. In one embodiment, the one or more first divider wall 32a may be positioned along the longitudinal length of the tank 10. In one embodiment, the one or more first divider wall 32a may be positioned substantially on the longitudinal midline of the tank 10. In one embodiment, the one or more first divider wall 32a may be positioned proximate to, and/or connected to, the one or more sidewall 12. The one or more first divider wall 32a may be composed of two or more pieces to extend the longitudinal length of the interior of the tank 10.

Figure 4A:
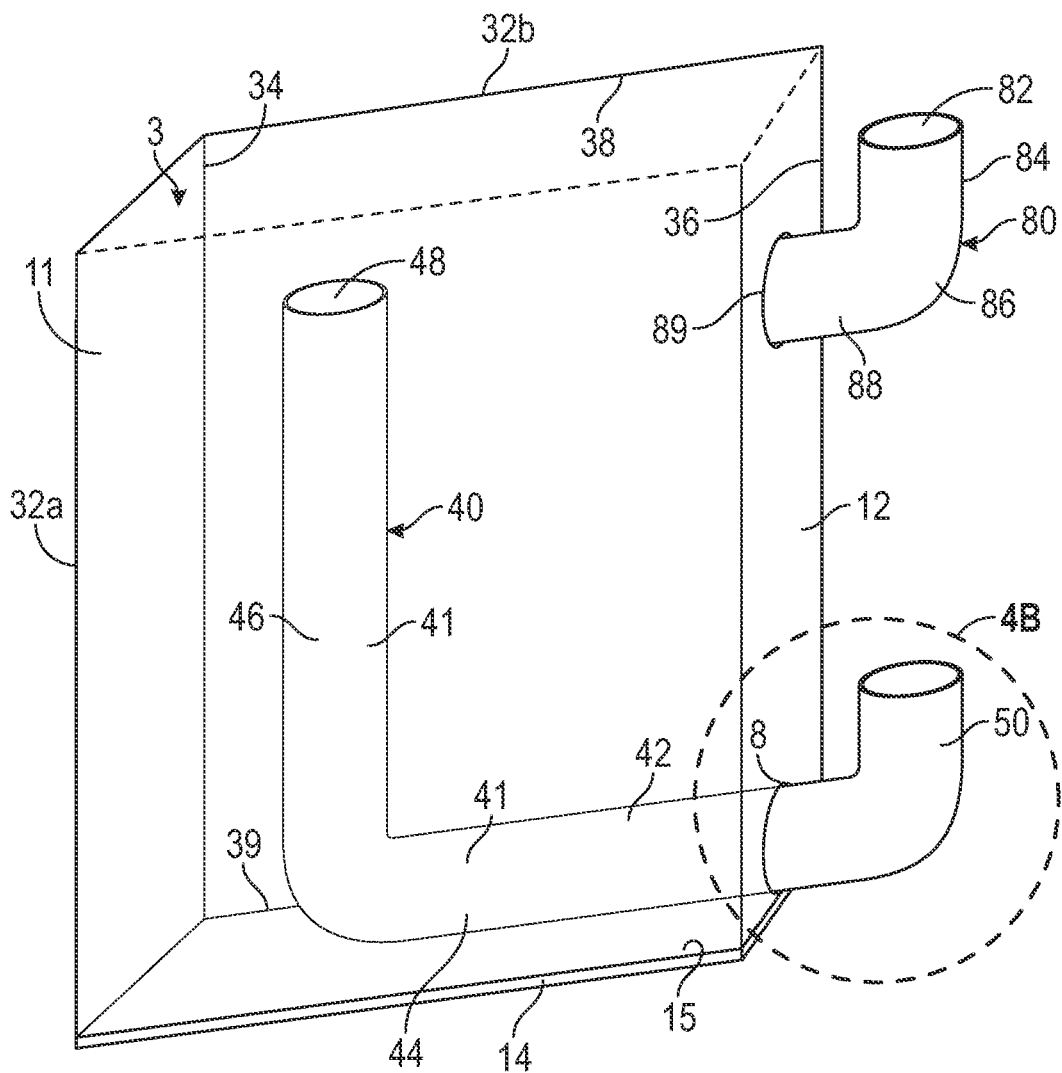
FIG. 4A is a perspective partial cross-sectional view of the exemplary fluid distillation system of FIG. 2.

In one embodiment, the one or more divider wall 32 may comprise one or more second divider wall 32b which extends along the lateral width of the tank 10. In one embodiment, the one or more divider walls 32a, 32b may divide the lower chamber 19 into three or more sections 11. As shown in FIG. 4A, the one or more second divider wall 32b has a proximate end 34, a distal end 36, a top 38, and a bottom 39. The proximate end 34 of the second divider wall 32b may be secured to the first divider wall 32a, the distal end 36 of the second divider wall 32b may be secured to the sidewall 12 of the tank 10, the bottom 39 of the one or more divider wall 32 may be secured to the top surface 15 of the bottom 14 of the tank 10, and the top 38 of the second divider wall 32b may be secured to the bottom side 4 of the mid-floor plate 3, thus creating a grid of sections 11. In one embodiment, the lower chamber 19 may not have one or more divider wall 32a. In another embodiment, the lower chamber 19 may not have one or more divider wall 32a and may not have one or more second divider wall 32b, thus not creating a grid of sections 11.

The one or more divider wall 32 may be secured by any suitable means, including welding or fasteners. Spacing of the one more divider wall 32 may depend on the size of the tank 10 and/or the size of the heating tube assembly 40.

In one embodiment, the number of the first divider walls 32a and/or the second divider walls 32b may depend on the number of desired sections 11. The number of the two or more sections 11 may be determined based on the size of the tank 10 such that air in each individual section 11 is heated at a pre-determined rate. An increased number of desired sections 11 may provide for more efficient gasification due to an increased number of BTU per square foot of the section 11. In one embodiment, the one or more divider wall 32 may be secured to the bottom 14, such as, for example, by welding, fastening, or other securing means. In one embodiment, the one or more divider wall 32 may be secured to the top surface 15 of the bottom 14 of the tank 10 and the bottom side 4 of the mid-floor plate 3 in such a way as to create an air tight section 11.

As illustrated in FIGS. 3 and 5, the one or more heating tube assembly 40 may be inserted into the interior of the two or more sections 11 through the opening 8 in the sidewall 12 of the tank 10. The one or more exhaust pipe 80 may be secured to the sidewall 12 of the tank 10 through the structure outlet 9, for example, by welding or fasteners. In one embodiment, the one or more exhaust pipe 80 may be positioned closer to the mid-floor plate 3 than to the opening 8 and the heating tube assembly 40. In one embodiment, the heating tube assembly 40 may be inserted into the interior of the lower chamber 19 through the opening 8 in the sidewall 12 of the tank 10.

FIG. 4A illustrates a partial cross-sectional view of the lower chamber 19 of the exemplary fluid distillation system 1 depicting an exemplary one of the sections 11, the heating tube assembly 40, and the exhaust pipe 80. The one or more divider wall 32 may cooperate with the bottom 14 of the tank 10 and the bottom side 4 of the mid-floor plate 3 to form an interior space of the section 11. In one embodiment, the one or more divider wall 32 may cooperate with the bottom 14 of the tank 10, the bottom side 4 of the mid-floor plate 3, the one or more sidewall 12, and/or the one or more end wall 20 to form the interior space of the section 11.

Figure 4B:
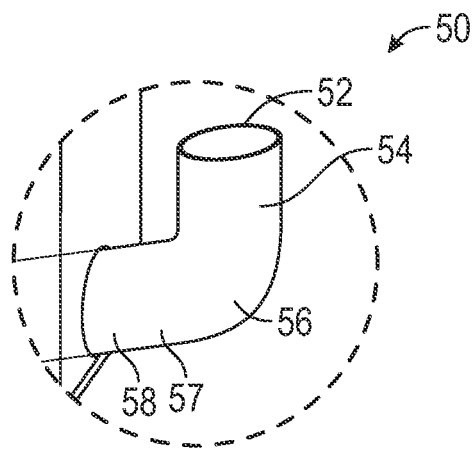
FIG. 4B is a partial perspective view of an exemplary outer burn chamber of the fluid distillation system of FIG. 4A.

As illustrated in FIG. 4A, the heating tube assembly 40 may have one or more outer burn chamber 50 positioned outside the tank 10 and one or more internal burn chamber 41 positioned in the interior of the tank 10 and fluidly connected to the outer burn chamber 50. As illustrated in FIG. 4B, the one or more outer burn chamber 50 may have an inlet 52, one or more sidewall 54, a bottom 56, an outlet 57, and a connecting tube 58 which may extend from the inlet 52 of the one or more outer burn chamber 50 through the opening 8 of the sidewall 12 of the tank 10 into the one or more internal burn chamber 41.

Returning to FIG. 4A, in one embodiment, the one or more internal burn chamber 41 may have a bend angle 44 and a vertical burn tube 46 extending toward the mid-floor plate 3. In one embodiment, the one or more internal burn chamber 41 may have a horizontal burn tube 42 which extends into the two or more sections 11 substantially parallel to the bottom 14 of the tank 10, a bend angle 44, and a substantially vertical burn tube 46 which extends toward the mid-floor plate 3. The internal burn chamber 41 may extend into the individual section 11 from the opening 8 at an angle from zero up to ninety degrees from the horizontal plane. The horizontal burn tube 42 connects to the bend angle 44, which connects the horizontal burn tube 42 to the vertical burn tube 46. The horizontal burn tube 42 connects to the bend angle 44, which makes an upward turn as it connects to the vertical burn tube 46. In one embodiment, the bend angle 44 may have a rounded shape. In one embodiment, the bend angle 44 may have an approximately 90° angle. In one embodiment, as the heating tube assembly 40 extends upward, the heating tube assembly 40 may be configured in a J-shape.

The vertical burn tube 46 may extend upward toward the bottom side 4 of the mid-floor plate 3 without coming in contact with the bottom side 4 of the mid-floor plate 3. In one embodiment the vertical burn tube 46 may extend toward to bottom side 4 of the mid-floor plate 3 until the vertical burn tube 46 is positioned below the bottom side 4 of the mid-floor plate 3 without making contact with the bottom side 4 of the mid-floor plate 3. In one embodiment the vertical burn tube extends to a height of approximately one and a half to approximately two inches below the bottom side 4 of the mid-floor plate 3. The vertical burn tube 46 may be secured to an inner surface of one or more divider wall 32. The horizontal burn tube 42 may be secured to the top surface 15 of the bottom 14 of the tank 10, such as by welding, fasteners, and/or other connecting means.

In one embodiment, the vertical burn tube 46 may have one or more opening in a sidewall of the vertical burn tube 46. In one embodiment, the vertical burn tube 46 may come in contact with the bottom side 4 of the mid-floor plate 3 when the sidewall of the vertical burn tube 46 has the one or more opening.

Figure 7:
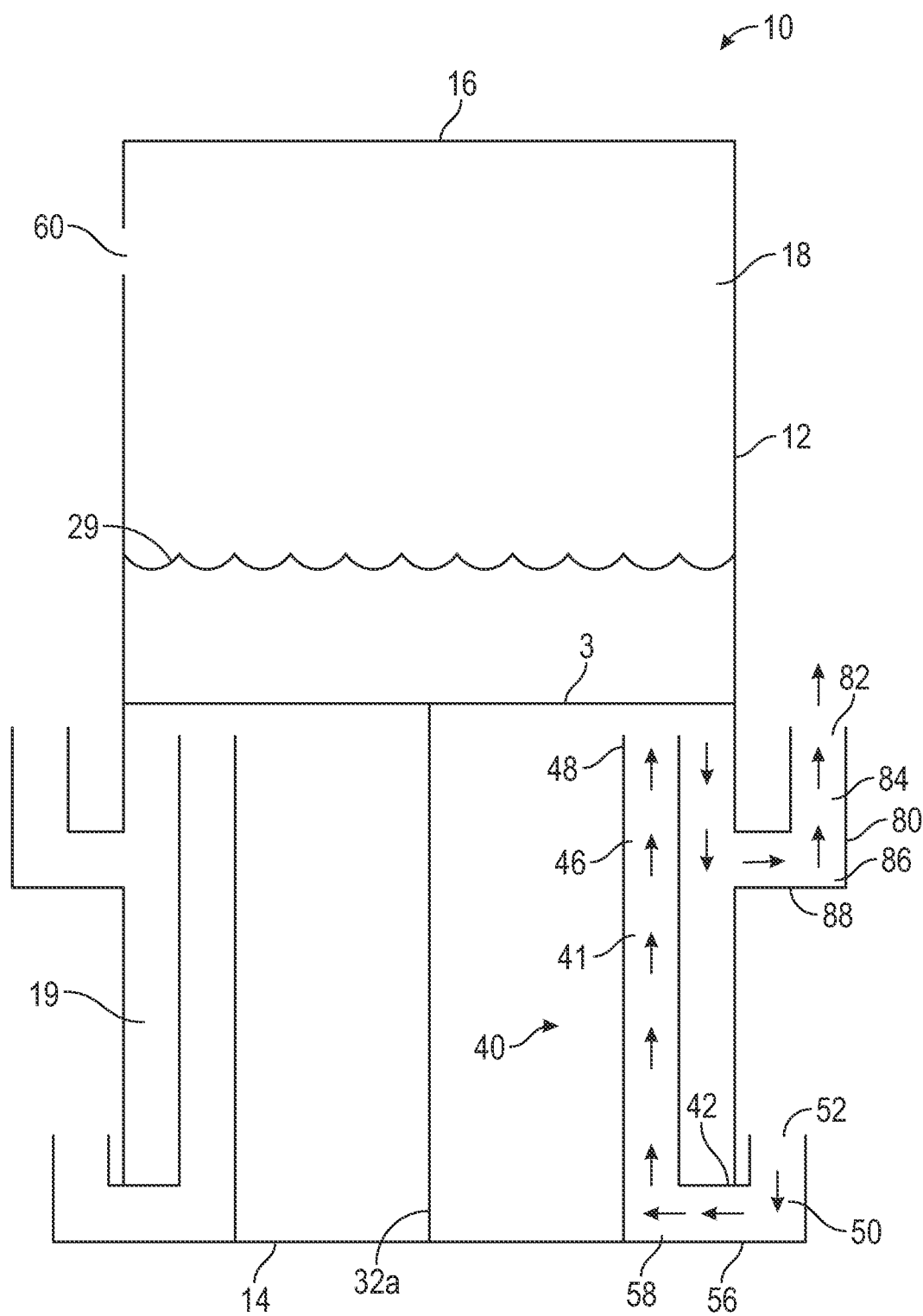
FIG. 7 is an exemplary method illustrated through a cross-sectional schematic view through the exemplary fluid distillation system of FIG. 2.

As seen in FIGS. 4A-4B and FIG. 7, the one or more outer burn chamber 50 of the heating tube assembly 40 may act as a primary combustion chamber, and the one or more internal burn chamber 41 may act as a secondary combustion chamber following the primary combustion chamber. The primary and secondary combustion chambers refer to the order in which the combustion chambers are disposed in the flow path of combustion gasses flowing from the outer burn chamber 50 through the one or more internal burn chamber 41. The secondary combustion chamber is located downstream from the primary combustion chamber.

As seen in FIG. 4B, the one or more outer burn chamber 50 may extend out of the opening 8 of the sidewall 12 of the tank 10. In one embodiment, the one or more outer burn chamber 50 may have a fan. The fan may have a horizontal axis generally aligned with the one or more sidewall 54 of the one or more outer burn chamber 50. The fan may be configured to force air entering the inlet 52 into the one or more internal burn chamber 41 through the outlet 57. A motor may be provided for driving the fan.

In one embodiment, the sidewall 54 of the one or more outer burn chamber 50 may be insulated. The insulation increases the temperature within the two or more sections 11 and prevents a lowering of temperatures during burn rates below a predetermined limit. The insulation may also maintain the primary combustion temperature at a higher level, which reduces the need for a temperature increase while passing through the one or more internal burn chamber 41.

The fluid distillation system 1 may further comprise a grate and/or an ash pan positioned in the bottom 56 of the outer burn chamber 50 for receiving and/or storing ashes. The grate may contain holes, slots, or other perforations to permit ashes to drop into the ash pan. The grate may support the solid fuel, such as wood or coal, in the one or more outer burn chamber 50. The perforations of the grate may be sufficiently small enough to prevent the resulting solid fuel from prematurely falling through into the ash pan. The ash pan may be accessed for removal through an opening, such as a door, in the outer burn chamber 50.

As seen in FIGS. 4A-4B, the one or more exhaust pipe 80 may have a connecting end 89, a releasing end 82, and a vertical section 84. In one embodiment, the one or more exhaust pipe 80 may have a horizontal section 88 and a bend angle 86. The one or more exhaust pipe 80 may be secured to the tank 10 by the structure outlet 9 by welding or fasteners. The exhaust pipe 80 may have a bend angle 86 between approximately zero and approximately one hundred and eighty degrees above the horizontal plane. In one embodiment, the exhaust pipe 80 may have a bend angle 86 of approximately ninety-degrees. The diameter of the exhaust pipe 80 may be a wider diameter than the structure outlet 9 diameter to which it is secured. The length of the exhaust pipe 80 may vary as needed for efficient fuel combustion, and the length may depend on a predetermined rate of conversion of fuel into gas.

The combination of the heating tube assembly 40 and the structure outlet 9, and/or the exhaust pipe 80, may be configured to act as an updraft fuel gasifier. The outer burn chamber 50 may provide a fast, initial, combustion, while the vertical burn tube 46, the structure outlet 9, and/or the exhaust pipe 80, may provide an updraft of air flow, aiding combustion in both the outer burn chamber 50 and, as needed, in the vertical burn tube 46.

In one embodiment, as seen in FIG. 1, the fluid distillation system 1 may have one or more temperature resistant discharge hose 72. The one or more temperature resistant discharge hose 72 may be secured to the one or more outlet 28 by any suitable means. The one or more temperature resistant discharge hose 72 may be configured to transfer the water vapor from the upper chamber of the tank 10 to a downstream condensation tank 70. In one embodiment, the fluid distillation system 1 may be a first fluid distillation system 1, and the one or more temperature resistant discharge hose 72 may connect the first fluid distillation system 1 to one or more second fluid distillation system 1 via a first end of the temperature resistant discharge hose 72 connecting to the one or more outlet 28 of the first fluid distillation system 1 and a second end of the temperature resistant discharge hose 72 connecting to the outlet 28 and/or the port 60 of a second fluid distillation system 1.

Figure 8:
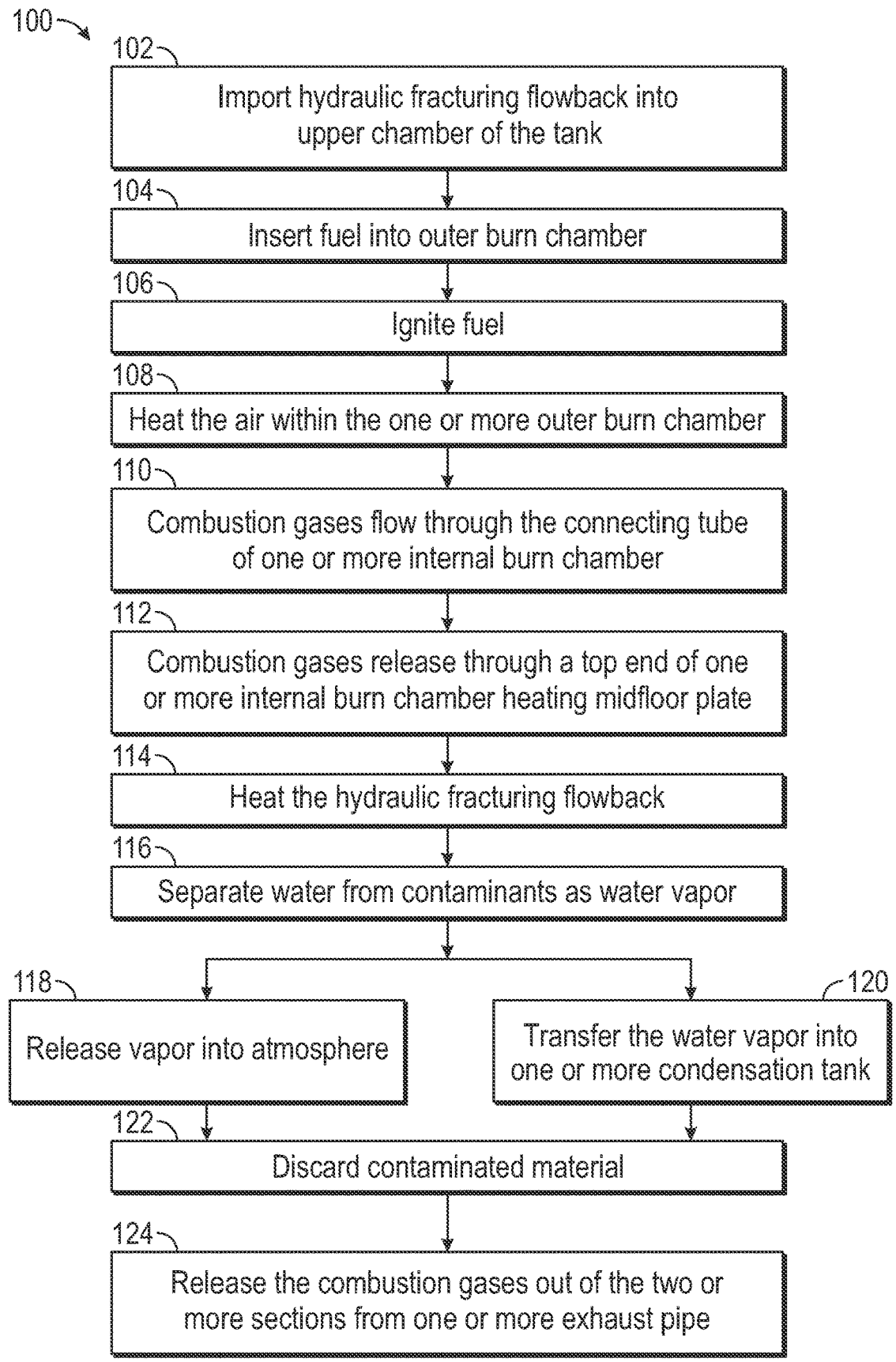
FIG. 8 is a flowchart of an exemplary method for fluid distillation in accordance with one aspect of the present disclosure.

In use, an exemplary fluid distillation method 100, as illustrated in FIG. 8, may be used to distill water from hydraulic fracturing flowback such that the volume of liquid in the hydraulic fracturing flowback is reduced, thereby reducing the amount of hydraulic fracturing flowback to store, transport, process, dispose, and treat.

In step 102 of the fluid distillation method, the extracted hydraulic fracturing flowback (such as that extracted from the subterranean formation 33 illustrated in FIG. 1) may be injected into the upper chamber 18, for example, through the one or more flowback port 60. As previously described, the one or more flowback port 60 may be located in the upper chamber 18 or the top 16 of the tank 10. The hydraulic fracturing flowback may be supported by the top side 2 of the mid-floor plate 3. The quantity of the hydraulic fracturing flowback injected into the upper chamber 18 may be dependent on the load capacity of the material which comprises the mid-floor plate 3. In one nonexclusive example, the hydraulic fracturing flowback is injected into the upper chamber 18 to fill the upper chamber 18 to an approximate depth of six inches.

As illustrated in FIG. 7, in step 104 of the method 100, fuel is inserted into the bottom 56 of the one or more outer burn chamber 50 through the inlet 52, either manually or mechanically. In one embodiment, fuel may be injected into the one or more outer burn chamber 50. In one embodiment, the fuel may rest on a grate or an ash pan. In step 106, the fuel may be ignited. Upon ignition of the fuel, in step 108, a primary air mass may become heated, helping to maintain the required combustion temperatures within the one or more outer burn chamber 50 creating hot combustion gases. In step 110, the hot combustion gases flow from the one or more outer burn chamber 50 through the connecting tube 58 into one or more internal burn chamber 41. As the hot gases are mixed with the secondary air found within the one or more internal burn chamber 41, the hot gases will combust.

In one embodiment, the one or more internal burn chamber 41 may have an opening. The opening of the one or more internal burn chamber 41 may maintain the secondary air found within the one or more internal burn chamber 41.

In one embodiment, secondary air found within the one or more internal burn chamber 41 may be maintained, for example, by forcing air found within the two or more sections 11 into the one or more internal burn chamber 41.

The mixing of the hot combustion gases with the air found in the secondary combustion chambers aids in the combustion of unburned contaminants as the hot combustion gases go through primary and secondary combustion. The heat generated in the outer burn chamber 50 may be used to sustain the secondary combustion in the one or more internal burn chamber 41.

In step 112, as the hot combustion gases flow upward through the one or more internal burn chamber 41, the hot combustion gases are released through the top end 48 of the heating tube assembly 40. This release of hot combustion gases concentrates heat near the bottom side 4 mid-floor plate 3, thereby heating the mid-floor plate 3. In step 114, as the mid-floor plate 3 is heated, the hydraulic fracturing flowback 29 is heated to its boiling point. In step 116, as the hydraulic fracturing flowback 29 is heated, the water is separated as water vapor from the contaminants found in the hydraulic fracturing flowback 29, while the contaminants settle on the top side 2 of the mid-floor plate 3. In one embodiment, in step 118, the tank 10 does not have a top 16, such that the water vapor is released directly into the atmosphere. In another embodiment, water vapor is released into the atmosphere through one or more outlet 28. In another embodiment, in step 120, a downstream condensation process may be incorporated for the water vapor. The downstream condensation process may utilize one or more temperature resistant discharge hose 72 either permanently or temporarily affixed to the fluid distillation system 1 by way of one or more outlet 28 by welding, fasteners, or the like. Upon removal of the water vapor in step 122, the remaining contaminants may be discarded.

In step 124, as the hot combustion gases may be released from the top end 48 of the one or more internal burn chamber 41, they are subsequently drawn out of the two or more sections 11 through one or more exhaust pipe 80. The hot combustion gases may flow through the exhaust pipe 80 flowing out of the releasing end 82. In one embodiment, the hot combustion gases may be drawn out of the internal burn chamber 41 through the structure outlet 9 and released into the atmosphere. In one embodiment, the hot combustion gases may be drawn out of internal burn chamber 41, such as by a fan. The release of the hot combustion gases may accelerate the rate the air is drawn into the one or more outer burn chamber 50 creating a self-sustaining combustion, so long as initial adequate burn rate is established and maintained by subsequent fuel loads.

The quantity of heat supplied to the mid-floor plate 3 may be regulated by the quantity of fuel supplied to the one or more outer burn chamber 50, or by placing a damper either within the one or more exhaust pipe 80 or the one or more outer burn chamber 50 to control the amount of air supplied to the fuel.

CONCLUSION

Conventionally, hydraulic fracturing flowback is either injected into a subterranean formation, collected and transported to a wastewater facility, or stored. In accordance with the present disclosure, the system distills hydraulic fracturing backflow, separating the contaminants from the water.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A fluid distillation method, comprising:
    importing a contaminated fluid into an upper chamber of a tank through one or more flowback ports positioned in one or more sidewalls of the tank;
    heating the contaminated fluid to a boiling point such that water in the contaminated fluid is vaporized and separated from the contaminated fluid by:
        inserting fuel into one or more outer burn chambers of a heating tube of the tank, the one or more outer burn chambers positioned externally to the tank and fluidly connected, via a connecting tube extending through the one or more sidewalls of the tank, to one or more internal burn chambers positioned in a lower chamber of the tank, the lower chamber of the tank separated from the upper chamber of the tank by a mid-floor plate;
        igniting the fuel in the one or more outer burn chambers such that combustion gases are created in the one or more outer burn chambers; and
        circulating the combustion gases through the connecting tube into the one or more internal burn chambers and releasing the combustion gases through a top end of the one or more internal burn chambers, thereby heating the mid-floor plate; and
    releasing the combustion gases out of the tank through one or more exhaust outlets extending through the one or more sidewalls of the tank.

2. The fluid distillation method of claim 1, further comprising releasing the vaporized water into the environment positioned external of the tank.

3. The fluid distillation method of claim 2, further comprising discarding remaining contaminated fluid after a pre-determined amount of water is vaporized out of the contaminated fluid.

4. The fluid distillation method of claim 1, further comprising discarding contaminants remaining after a pre-determined amount of water is vaporized out of the contaminated fluid.

5. The fluid distillation method of claim 1, further comprising transferring the vaporized water into one or more condensation tanks through one or more temperature resistant discharge hoses.

6. The fluid distillation method of claim 1, wherein the tank has a top.

7. The fluid distillation method of claim 1, wherein the tank is a fracturing tank.

8. The fluid distillation method of claim 1, further comprising one or more exhaust pipes extending from corresponding ones of the one or more exhaust outlets.

9. The fluid distillation method of claim 1, wherein the upper chamber further comprises one or more outlets.

* * * * *